US005728786A

United States Patent [19]
Young et al.

[11] Patent Number: 5,728,786
[45] Date of Patent: Mar. 17, 1998

[54] STYRL-MODIFIED ACRYLATE POLYMER PRESSURE SENSITIVE ADHESIVE BEADS

[75] Inventors: Chung I. Young, Roseville; Albert I. Everaerts, Oakdale; Stephen E. Krampe, Maplewood, all of Minn.

[73] Assignee: Minnesota Mining and Manufacturing Company, St. Paul, Minn.

[21] Appl. No.: 680,092

[22] Filed: Jul. 15, 1996

[51] Int. Cl.$^6$ .................... C08F 2/00; C08F 218/00
[52] U.S. Cl. ............ 526/206; 526/318.45; 526/214; 526/307.7; 526/217
[58] Field of Search ................ 526/307.7, 206, 526/318.45, 214, 217

[56] References Cited

U.S. PATENT DOCUMENTS

| 3,242,121 | 3/1966 | Hill, Jr. ............................... 260/29.6 |
|---|---|---|
| 3,786,116 | 1/1974 | Milkovich et al. ................. 260/885 |
| 3,839,308 | 10/1974 | Carrock ........................... 260/88.1 PC |
| 4,074,004 | 2/1978 | Bateson et al. ..................... 526/318.4 |
| 4,314,932 | 2/1982 | Wakimoto et al. ................. 260/42.53 |
| 4,385,156 | 5/1983 | Ingram et al. ..................... 525/253 |
| 4,631,307 | 12/1986 | Hosoda et al. ..................... 524/269 |
| 4,833,179 | 5/1989 | Young et al. ...................... 522/183 |
| 4,898,909 | 2/1990 | Vietmeier et al. .................. 524/820 |
| 4,952,650 | 8/1990 | Young et al. ...................... 526/318.4 |
| 5,120,789 | 6/1992 | Schmelzer et al. ................. 525/142 |
| 5,292,844 | 3/1994 | Young et al. ...................... 526/329.5 |
| 5,374,698 | 12/1994 | Young et al. ...................... 526/318.4 |
| 5,382,451 | 1/1995 | Johnson et al. .................... 427/208.4 |
| 5,464,916 | 11/1995 | Young et al. ...................... 526/264 |

FOREIGN PATENT DOCUMENTS

| 0170400 | 2/1986 | European Pat. Off. ............ 526/307.7 |
|---|---|---|
| 0 405 872 A1 | 1/1991 | European Pat. Off. ...... C08F 212/08 |
| 0 554 832 A1 | 2/1993 | European Pat. Off. ........... C09J 7/02 |

Primary Examiner—Joseph J. Schofer
Assistant Examiner—N. Sarofim
Attorney, Agent, or Firm—Minnesota Mining and Manufacturing Company

[57] ABSTRACT

Styryl-modified acrylate polymer pressure sensitive adhesive beads, adhesive films made therefrom and methods of making the same. Surprisingly, the polymerization of styryl-functional monomer into bead formulations provides beads that can be easily extruded and made into adhesive films having high shear strength. The polymerization of styryl-functional monomer into bead formulations comprising methacrylic acid also obviates the need to use a modifier moiety.

26 Claims, No Drawings

5,728,786

1

STYRL-MODIFIED ACRYLATE POLYMER PRESSURE SENSITIVE ADHESIVE BEADS

FIELD OF THE INVENTION

The present invention relates to styryl-modified acrylate polymer pressure sensitive adhesive beads and adhesive films made therefrom. The present invention further relates to methods of aqueous suspension polymerization to provide styryl-modified acrylate polymer pressure sensitive adhesive beads.

BACKGROUND OF THE INVENTION

Suspension polymerization is a well known method of polymerization in which spherical beads of polymer are formed. U.S. Pat. Nos. 4,833,179 and 4,952,650 (Young et al.), for example, describe methods of aqueous suspension polymerization to form pressure sensitive acrylate copolymer beads. These methods generally comprise making a monomer premix comprising an acrylic acid ester of a non-tertiary alcohol, a polar monomer copolymerizable with the acrylic acid ester, a chain transfer agent, a free radical initiator, and modifier moiety; and combining the premix with a water phase containing a sufficient amount of suspending agent to form a suspension. Polymerization is then permitted with agitation until polymer beads are formed. The polymer beads may be stored for a length of time in water prior to coating. During this storage time, it is important that the beads are storage stable and do not agglomerate or clump together, since this will make subsequent transportation and handling difficult. To avoid such problems, the modifier moiety is typically provided in an amount sufficient to render the copolymer bead non-agglomerating at room temperature. When a coating of adhesive is desired, the beads are collected, dried and coated using extrusion techniques at elevated temperatures.

U.S. Pat. No. 5,292,844 also describes a method of aqueous suspension polymerization to form pressure sensitive acrylate copolymer beads. The method generally comprises making a monomer premix comprising an acrylic acid ester of a non-tertiary alcohol, a polar monomer copolymerizable with the acrylic acid ester, a vinyl acetate monomer, a chain transfer agent, a free radical initiator, and modifier moiety; and combining the premix with a water phase containing a sufficient amount of suspending agent to form a suspension. Polymerization is then permitted with agitation until polymer beads are formed. This reference reports that the incorporation of vinyl acetate into the bead formulation provides beads which are easily extruded at low temperatures and which are non-agglomerating.

While the foregoing methods of aqueous suspension polymerization and the resulting acrylate polymer pressure sensitive adhesive beads have proven useful, others are sought.

SUMMARY OF THE INVENTION

The present invention provides styryl-modified acrylate polymer pressure sensitive adhesive beads. Preferably, the beads comprise:

(a) about 70 to about 98 parts by weight of an acrylic acid ester monomer of a non-tertiary alcohol, the alcohol having from 1 to 14 carbon atoms, with the average number of carbon atoms being 4 to 12;

(b) about 0.05 to about 15 parts by weight of a polar monomer;

(c) about 0.1 to about 10 parts by weight of a styryl-functional monomer;

2 wherein the sum of (a), (b), and (c) comprises 100 parts by weight;

(d) about 0.01 to about 0.5 part by weight of a chain transfer agent;

(e) about 0.05 to about 1.0 part by weight of a free-radical initiator; and (f) optionally, about 0.01 to about 30 parts by weight of a modifier moiety;

wherein (d), (e), and (f) are each independently based upon 100 parts by weight monomer content.

Surprisingly, the beads of the present invention (1) can be easily coated using extrusion techniques and (2) provide adhesive films having high shear strength. In addition, when the polar monomer (component b) is methacrylic acid, the use of a modifier moiety is not needed to achieve stable or non-agglomerating beads.

In another embodiment, the present invention also provides a method of aqueous suspension polymerization to provide a styryl-modified acrylate polymer pressure sensitive adhesive beads. The method comprises the steps of making a monomer premix containing components (a) through (e) and optionally (f) described above; combining the monomer premix with a water phase containing a suspending agent to form an oil-in-water suspension; concurrently agitating the oil-in-water suspension and permitting polymerization of the monomers until an aqueous suspension of polymer beads is formed; and collecting the polymer beads. When used, component (f) may be present in one or more of the following: the monomer-containing premix; the water phase; the oil-in-water suspension; and/or the aqueous suspension of polymer beads after the exotherm of the polymerization has been reached.

The present invention also provides a method of aqueous suspension polymerization to provide acrylate polymer pressure sensitive adhesive beads that are free of any modifier moiety. The method comprises the steps of making a monomer premix containing components (a) through (e) described above wherein component (b) is methacrylic acid; combining the monomer premix with a water phase containing a suspending agent to form an oil-in-water suspension; concurrently agitating the oil-in-water suspension and permitting polymerization of the monomers until an aqueous suspension of polymer beads is formed; and collecting the polymer beads.

In another embodiment, the present invention provides an aqueous suspension of styryl-modified acrylate polymer pressure sensitive adhesive beads. In another embodiment, the present invention provides a non-agglomerating aqueous suspension of styryl-modified acrylate polymer pressure sensitive adhesive beads wherein the beads are free of any modifier moiety.

In still another embodiment, the present invention provides a pressure sensitive adhesive film derived from the styryl-modified acrylate polymer pressure sensitive adhesive beads. The pressure sensitive adhesive film may be provided on at least a portion of at least one major surface of a substrate to give an adhesive article such as a tape. Extrusion is a preferred method of applying the beads to a substrate. Such extrusion destroys the bead configuration and results in a continuous film of pressure sensitive adhesive.

DETAILED DESCRIPTION OF THE INVENTION

The present invention provides styryl-modified acrylate polymer pressure sensitive adhesive beads. The term "styryl-modified" means that at least one of the monomers used to polymerize the beads is a styryl-functional monomer. The term "pressure sensitive adhesive" refers to a material which is tacky at room temperature and adheres to a variety of surfaces upon contact without the need of more than hand pressure. Such materials typically have a glass transition temperature ($T_g$) of 0° C. or less. Preferably, the styryl-modified acrylate polymer pressure sensitive adhesive beads of the present invention comprise:

(a) about 70 to about 98 parts by weight of an acrylic acid ester monomer of a non-tertiary alcohol, the alcohol having from 1 to 14 carbon atoms, with the average number of carbon atoms being 4 to 12;

(b) about 0.05 to about 15 parts by weight of a polar monomer;

(c) about 0.1 to about 10 parts by weight of a styryl-functional monomer;

wherein the sum of (a), (b), and (c) comprises 100 parts by weight;

(d) about 0.01 to about 0.5 part by weight of a chain transfer agent;

(e) about 0.05 to about 1.0 part by weight of a free-radical initiator; and (f) optionally, about 0.01 to about 30 parts by weight of a modifier moiety;

wherein (d), (e), and (f) are each independently based upon 100 parts by weight monomer content.

Surprisingly, the beads of the present invention (1) can be easily coated using extrusion techniques and (2) provide adhesive films having high shear strength. A good balance of these properties is often difficult to achieve. Oftentimes, attempts to improve shear strength cause an increase in melt viscosity, making the beads difficult to coat at melt temperatures. For example, the molecular weight of the acrylate polymer may be increased or the acrylate polymer may be crosslinked to improve shear strength. Unfortunately, these measures also typically cause the melt viscosity to increase, thereby making extrusion coating difficult or impossible.

Thus, the ability to prepare acrylate polymer pressure sensitive adhesive beads that are easily coated using extrusion techniques and which provide adhesive films having high shear strength is advantageous.

The polymerization of a styryl-functional monomer into the bead also provides an unexpected result when the polar monomer (component (b)) is methacrylic acid (MAA). In these particular formulations, the use of a modifier moiety becomes unnecessary to achieve stable or non-agglomerating beads. The term "non-agglomerating" means that the beads can be prepared and stored at room temperature (21° C.) for one week, with substantially no clumping of the beads.

Regarding this second unexpected result, it is noted that modifier moieties such as reactive zinc salts have typically been used in prior art methods of suspension polymerization of acrylate beads comprising methacrylic acid. See, for example, U.S. Pat. Nos. 4,833,179; 4,952,650; and 5,292,844. The purpose of the modifier moiety is to enhance the stability of the beads during polymerization, transportation and storage by preventing the beads from agglomerating. The use of reactive zinc salts, however, increases the cohesive strength of the polymer beads, making them difficult to coat without the use of high temperatures (350°–380° F.). The use of such high coating temperatures is disadvantageous in that decomposition of the polymer can occur.

Thus, the ability to prepare stable acrylate beads comprising MAA without a modifier moiety is also advantageous.

We turn now to a discussion of the various components which comprise the bead formulation of the present invention.

Component (a) of the bead formulation comprises an acrylic acid ester monomer of a non-tertiary alcohol, the alcohol having from 1 to 14 carbon atoms, with the average number of carbon atoms being 4 to 12. Included within this class of monomers are, for example, isooctyl acrylate, isononyl acrylate, 2-ethylhexyl acrylate, decyl acrylate, dodecyl acrylate, n-butyl acrylate, hexyl acrylate, and mixtures thereof. Preferred monomers include isooctyl acrylate, isononyl acrylate, butyl acrylate, 2-ethylhexyl acrylate, and mixtures thereof. Component (a) comprises from about 70 to about 98 parts based on 100 parts total monomer content, preferably from about 80 parts to about 97 parts, even more preferably from about 85 to about 96 parts.

Component (b) of the bead formulation comprises a polar monomer. Polarity or hydrogen-bonding ability is frequently described by the use of terms such as "moderately", "strongly" and "poorly". References describing these terms include "Solvents", *Paint Testing Manual*, 13th Ed. Sward, G. G., Editor, American Society for Testing and Materials, Philadelphia, Pa., 1972, and "A Three-Dimensional Approach to Solubility", *Journal of Paint Technology*, Vol. 38, No. 496, pp. 269–280. Preferably, component (b) comprises one or more moderately polar or strongly polar monomers, or mixtures thereof. Strongly polar monomers useful herein include acrylic acid (AA), methacrylic acid (MAA), beta-carboxyethyl acrylate, itaconic acid, hydroxyalkyl acrylates, styrene sulfonic acid or the sodium salt thereof, maleic acid, fumaric acid, citraconic acid, acrylamides, substituted acrylamides, and mixtures thereof. Moderately polar monomers useful herein include N-vinyl lactams such as N-vinyl pyrrolidone, N-vinyl caprolactam, acrylonitrile, N,N-dimethyl amino-propyl methacrylate, vinyl chloride, and mixtures thereof. Preferred polar monomers include AA, MAA, acrylamides, substituted acrylamides, and mixtures thereof. Of these, MAA and AA are preferred. Of these, MAA is preferred over AA since a brine solution is typically used with AA to improve the incorporation of AA into the polymer bead during suspension polymerization. The use of such a brine solution is undesirable since it requires additional processing steps to remove the salt from the water phase prior to disposal. Polar monomer(s) typically comprise about 0.05 to about 15 parts based upon 100 parts total monomer content, preferably about 2 to about 8 parts, and most preferably about 3 to about 7 parts.

Component (c) of the bead formulation comprises a styryl-functional monomer. Useful styryl-functional monomers for the present invention include those represented by the following structure:

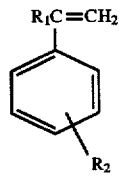

wherein $R_1$ is hydrogen or an alkyl group having 1 to 10, preferably 1 to 2, carbon atoms (e.g., methyl or ethyl); and $R_2$ is hydrogen, an alkyl group having 1 to 10, preferably 1 to 3, carbon atoms, a halo group (e.g., a chloro or bromo group), or a nitro group. Examples of such structures include styrene, mono-substituted styrene such as p-methyl styrene, m-ethyl styrene, p-tert-butyl styrene, p-chloro styrene, alpha-methyl styrene, and mixtures thereof. Of these, styrene is preferred. Monomer(s) having styryl functionality comprise from about 0.1 to about 10 parts based on 100 parts total monomer content, preferably from about 1 to about 9 parts, more preferably from 1 to 5 parts.

Component (d) of the bead formulation comprises a chain transfer agent. Useful chain transfer agents include mercaptans, alcohols, carbon tetrabromide, and mixtures thereof. Isooctyl thioglycolate and carbon tetrabromide are preferred. The chain transfer agent is preferably present in an amount ranging from about 0.01 to about 0.5 part, preferably about 0.01 to about 0.2 part, based on 100 parts total monomer content.

Component (e) of the bead formulation comprises a free-radical initiator. Initiators for polymerizing the monomers to provide the beads of the invention are those which are normally suitable for free-radical polymerization of acrylate monomers and which are oil-soluble and have low solubility in water, e.g., organic peroxides such as benzoyl peroxide, lauryl peroxide and various thermal initiators. Preferred thermal initiators include 2,2-azo-bis-(2,4-dimethylpentane nitrile), commercially available from E.I. duPont de Nemours under the trade name Vazo™ 52, and 2,2-azo-bis-(isobutyronitrile), commercially available from E.I. duPont de Nemours under the tradename Vazo™ 64. The initiator is preferably present in an amount ranging from about 0.05 to about 1 part, preferably about 0.1 to about 1.0 part, based on 100 parts total monomer content.

Optional modifier moieties (component (f)) useful in the method of the present invention include reactive zinc salts, macromers, hydrophobic silica, and mixtures thereof. When used, the modifier moiety is typically present in an amount ranging from about 0.05 to about 30 parts per 100 parts by weight total monomer content, preferably about 0.05 to about 14 parts by weight, and most preferably about 0.1 to about 10 parts by weight. The amounts listed for the modifier moiety constitute the total amount added regardless whether it is added to one or more of the following phases: the monomer-containing premix; the water phase; the oil-in-water suspension; and the aqueous suspension of polymer beads after the exotherm of the polymerization has been reached. Total monomer content refers to the weight of acrylic acid ester monomer, polar monomer, and styryl-functional monomer.

Preferred modifier moieties include the reactive zinc salts. Useful reactive zinc salts include zinc oxide and organic zinc compounds such as zinc methacrylates, zinc acrylates, zinc octoate, zinc acetate, zinc formate, mixtures thereof, and the like. When a zinc salt is used, it is preferably present in an amount ranging from about 0.01 to about 5 parts by weight based upon the total weight of the copolymer beads formed, more preferably from about 0.05 to about 2 parts by weight, most preferably from about 0.1 to about 1 part by weight. The reactive zinc salts are preferably added to the monomer-containing premix, the water phase, or to the suspension after the exotherm has been reached (i.e., near the end of or after the polymerization).

A variety of macromers can also be used as modifier moieties. Examples include those described in U.S. Pat. No. 3,786,116. The macromer is preferably present in an amount ranging from about 0.05 to about 20 parts based on 100 parts total monomer content, preferably about 0.1 to about 10 parts, most preferably about 3 to about 7 parts. The macromer is preferably added to the monomer-containing premix.

When hydrophobic silica is used, it is preferably present in an amount ranging from about 0.1 to about 5 parts by weight based upon the total weight of the copolymer beads formed, more preferably about 0.5 to about 2 parts by weight, and most preferably about 0.8 to about 1.5 parts by weight. The hydrophobic silica is preferably added after the exotherm of the polymerization has been reached.

Photocrosslinking agents may also be used to provide the beads of the present invention. Preferred crosslinking agents include copolymerizable aromatic ketone monomers, especially 4-acryloxybenzophenone. When present, the photocrosslinker generally comprises from about 0.01 to about 5.0 parts based on 100 parts total monomer weight.

The beads of the invention may also contain or be formulated with one or more conventional additives. Preferred additives include tackifiers, plasticizers, pigments and dyes, extenders, fillers, antioxidants, stabilizers and multifunctional crosslinkers. An especially preferred additive is bis-vinyl ether. When present, this additive generally comprises from about 0.5 to about 1 part based on 100 parts total monomer content.

The beads of the invention are prepared by an aqueous suspension polymerization technique utilizing conventional suspension agents with optional anionic surfactants. Useful suspending agents include those that are conventionally used in suspension polymerization processes. They may be minimally water-soluble inorganic salts such as tribasic calcium phosphate, calcium sulfate, barium sulfate, barium phosphate, hydrophilic silicas, and magnesium carbonate. Of these, barium sulfate, hydrophilic silicas, and tribasic calcium phosphate are preferred. Water-soluble organic suspending agents may also be used, e.g., polyvinyl alcohol, poly-N-vinyl pyrrolidone, polyacrylic acid, polyacrylamide and hydroxyalkyl cellulose. The suspending agent is preferably present in an amount ranging from about 0.01 part to about 5 parts based on 100 parts total monomer content.

When used, the amount of surfactant is preferably below the critical micelle concentration (CMC). Critical micelle concentration means the minimum concentration of surfactant necessary for the formation of micelles, i.e., submicroscopic aggregations of surfactant molecules. Typically, this amount will be in the range of from about 0 to about 5000 ppm, based on 100 parts total monomer content. Preferably, the surfactant is present in an amount in the range of from about 2.5 ppm to about 2000 ppm, based on 100 parts total monomer content. Preferred surfactants include sodium lauryl sulfate, sodium dioctyl sulfosuccinate, and mixtures thereof. Non-ionic surfactants, such as the poly(ethylene oxide) type, may also be included so long as an anionic surfactant is also present and the total amount of surfactants does not exceed the CMC.

Before, during or after polymerization, bases may be added to enhance bead stability. In general, the bases react with acid groups which are present on the surface of the polymer bead to impart a charge to the bead. Such acid groups include carboxylic groups pendant from the polymer backbone, contributed by the MAA or AA monomer polymerized into the polymer. The introduction of a charge provides extra storage stability due to electrostatic repulsion between the beads. Useful bases include inorganic bases such as ammonia, tertiary amines, lithium hydroxide, sodium hydroxide, potassium hydroxide, calcium carbonate, ammonium hydroxide and mixtures thereof. Of these, ammonia, tertiary amines and ammonium hydroxide are preferred.

Typically, a monomer-containing premix is prepared by mixing the monomers, chain transfer agent, and free-radical initiator. A modifier moiety and other optional ingredients may also be included in the monomer-containing premix.

The premix is then combined with a water phase comprising a suspending agent, water, optionally a surfactant and optionally a modifier moiety in order to form a suspension. The resulting suspension typically comprises about 10 to about 55 weight percent monomer-containing premix and about 90 to about 45 weight percent water phase, preferably about 40 to about 45 weight percent monomer-containing premix and about 60 to about 55 weight percent water phase. Above about 55 weight percent monomer-containing premix, phase inversion may occur. The monomers contained in the suspension are typically polymerized with agitation for about 2 to about 16 hours at a temperature of about 40° C. to about 90° C. to give a suspension which contains the copolymer beads. The beads are then washed and separated from the water by means such as gravity filtration. The filtered product also generally comprises about 15 to 30 percent water.

The beads are relatively large in size and typically spherical with diameters in the range of 5 to about 500 micrometers, more preferably about 100 to about 300 micrometers.

The filtration products of the present invention, comprising the beads and water, may be transported and stored without the elaborate safety and environmental procedures which may be necessary when organic solvents are present.

The beads of the present invention may be used to provide composite materials, e.g., materials prepared by mixing one or more materials with the beads. The beads of the present invention may also be used in any application in which acrylate adhesives otherwise produced may be used. In order to make adhesive coated products, the beads may be extruded. Such extrusion destroys the bead configuration and results in a continuous film of pressure sensitive adhesive. These adhesive compositions may be applied to a substrate via extrusion coating. Alternatively, the beads may dissolved in a compatible solvent and coated using a variety of techniques including roller, dip, brush, curtain or other solution coating techniques. The beads may be coated onto any suitable substrate to provide an adhesive-coated article such as a tape, transfer film, and the like. A wide variety of substrates may be used such as paper substrates, plastic substrates (including woven and non-woven substrates and foamed substrates), metal foils, and the like. The substrate is typically selected based on the intended use of the adhesive article. For example, when the beads of the invention are used to provide medical tapes, wound dressings or surgical drapes, the beads are preferably coated onto a substrate which is conformable to the body, for example, cellulosic or synthetic polymeric woven or nonwoven materials, thin polymeric films such as polyurethanes, polyethylenes, polyethylene/vinyl acetate copolymers, and other backing materials useful for medical applications. The substrate may inherently comprise a release surface or more commonly, be coated with a release coating on one or both surfaces, e.g., a silicone-coated paper. For example, when a transfer film is desired, the beads are typically coated onto a release surface of a substrate. The substrate in this case is temporary since it is typically removed upon use of the transfer film.

These and other aspects of the invention are illustrated by the following examples which should not be viewed as limiting in scope.

EXAMPLES

TEST METHODS

A. SHEAR HOLDING STRENGTH (Reference: ASTM: D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

B. PEEL ADHESION TEST (Reference: ASTM R3330-78 PSTC-1 (11/75))

Peel adhesion is the force required to remove a coated flexible sheet material from a test panel measured at a specific angle and rate of removal. In the examples this force is expressed in Newtons per 100 mm (N/100 mm) width of coated sheet. The procedure follows:

1. A 12.5 mm width of the coated sheet is applied to the horizontal surface of a clean glass test plate with at least 12.7 lineal cm in firm contact. A 2.0 kg (4.5 lb.) hard rubber roller is used to apply the strip.
2. The free end of the coated strip is doubled back nearly touching itself, so the angle of removal will be 180°. The free end is attached to the adhesion tester scale.
3. The glass test plate is clamped in the jaws of the tensile testing machine which is capable of moving the plate away from the scale at a constant rate of 2.3 meters per minute.
4. The scale reading in Newtons is recorded as the coated sheet is peeled from the glass surface. The data is recorded as the average value of the range of numbers observed during the test.

C. MELT VISCOSITY MEASUREMENT A Goettfert capillary viscometer was used to measure viscosity as a function of shear rate at various temperatures. All measurements were performed using a capillary having an aspect ratio (L/R) of 60. The viscosity measurement covered an approximate shear rate range of 50 sec$^{-1}$ to 500 sec$^{-1}$. The viscosity at shear rate of 200 sec$^{-1}$ and at temperature of 150° C. is reported in Table III as melt viscosity.

COMPARATIVE EXAMPLES C-1, C-2, AND C-3 AND EXAMPLES 1-6

Acrylate polymer beads were prepared with and without styrene. More specifically, the beads of Comparative Examples C-1, C-2, and C-3 were prepared without styrene, while the beads of Examples 1-6 were prepared with styrene.

Each reaction was carried out in a two liter split flask equipped with condenser, thermowell, nitrogen inlet, stainless steel motor driven agitator, and a heating mantle with temperature control. The reaction flask was first charged with deionized water (referred to as Charge A in Table II) followed by the addition of zinc oxide ZnO (referred to as Charge I in Table II) and hydrophilic silica Cab-O-Sil™ EH-5 from Cabot Corporation of Tuscola, Ill. (referred to as Charge B in Table I). The reactor was heated to 55° C. while purging with nitrogen until the ZnO and Cab-O-Sil™ EH-5 was thoroughly dispersed. The quantities of Charges A, I, and B used can be found in Table II.

In a separate glass container, isooctyl acrylate (IOA) methacrylic acid, styrene (if used) and isooctylthioglycolate (referred to as Charges C, D, E, and F, respectively, in Table II) were mixed together, followed by the addition of Vazo™ initiator (referred to as Charge G or H in Table II) with mixing until the solution became clear. The quantities of Charges C, D, E, F, and G or H used can be found in Table II. The resulting solution was then added to the mixture in the reaction flask with vigorous agitation (700 RPM) to obtain a suspension. The reaction was continued with nitrogen purging for at least 6 hours, during which time it was monitored to prevent the reaction temperature from exceeding 70° C. The beads were then collected using a Buchner funnel and washed several times with deionized water. The resulting filtration product contained about 15 to 30% of water and was non-agglomerating.

viscosities than formulations without styryl-functional monomer. For example, Comparative Example C-1 provided a shear strength of 15 minutes and a melt viscosity of 220,000 cps compared to Example 1 which provided a shear strength of 105 minutes and a melt viscosity of 100,000 cps. It is noted that while C-2 provided a melt viscosity of 110,000, its shear strength was only 4 min. The data also suggest an increase in shear strength with percent styrene. Note in particular Examples 3–6 which show that shear strength increases with percent styrene content.

COMPARATIVE EXAMPLE C-4 AND EXAMPLES 7–8

Acrylate polymer beads were prepared using methacrylic acid (MAA) with and without styrene. More specifically, the

TABLE II

| Charge | Description | Amounts Charged*: | | | | | | | | |
|---|---|---|---|---|---|---|---|---|---|---|
| | | C-1 | C-2 | C-3 | 1 | 2 | 3 | 4 | 5 | 6 |
| A. | D.I. Water | 750 | 750 | 750 | 750 | 750 | 750 | 750 | 750 | 750 |
| B. | Cab-O-Sil EH-5 | 0.75 | 0.75 | 0.75 | 0.75 | 0.75 | 0.75 | 0.75 | 0.75 | 0.75 |
| C. | Isooctyl acrylate | 480 | 480 | 480 | 470.25 | 470.25 | 472.6 | 470.25 | 465.5 | 460.75 |
| D. | Methacrylic acid | 20 | 20 | 20 | 24.75 | 24.75 | 24.9 | 24.75 | 24.5 | 24.25 |
| E. | Styrene | 0 | 0 | 0 | 6.9 | 5 | 2.5 | 5 | 10 | 15 |
| F. | Isooctylthioglycolate | 0.25 | 0.35 | 0.375 | 0.35 | 0.35 | 0.35 | 0.35 | 0.35 | 0.35 |
| G. | Vazo 64 | 2.5 | 2.5 | — | — | — | — | — | — | — |
| H. | Vazo 52 | — | — | 2.5 | 2.5 | 2.5 | 2.5 | 2.5 | 2.5 | 2.5 |
| I. | ZnO | 2.5 | 1.25 | 2.5 | 2.5 | 1.0 | 2.5 | 2.5 | 2.5 | 2.5 |

*The quantities listed for charges C, D, and E are provided in parts by weight. The quantities listed for the remaining charges are based on 100 parts of charges C, D, and E (when used).

The beads of each example were dried and tested for Melt Viscosity. The dried beads were further dissolved in ethyl acetate and coated to a dry thickness of 23 micrometers on a 37 micrometer polyester film. The coated films were tested for Peel Adhesion and Shear Strength using the test methods described above. Results are reported in Table III.

TABLE III

EFFECT OF STYRENE ON MELT VISCOSITY AND ADHESIVE PROPERTIES

| | | | | Adhesives Properties | |
|---|---|---|---|---|---|
| Example | Composition | % Styrene | Melt Viscosity (cps) | Peel Adhesion (N/dm) | Shear strength (min) |
| C-1 | IOA/MAA | 0 | 220,000 | 34 | 15 |
| C-2 | IOA/MAA | 0 | 110,000 | 32 | 4 |
| C-3 | IOA/MAA | 0 | NT | 31 | 10 |
| 1 | IOA/MAA/Styrene | 1.4 | 100,000 | 27 | 105 |
| 2 | IOA/MAA/Styrene | 1.0 | 85,000 | 29 | 15 |
| 3 | IOA/MAA/Styrene | 0.5 | NT | 30 | 65 |
| 4 | IOA/MAA/Styrene | 1 | 85,000 | 28 | 137 |
| 5 | IOA/MAA/Styrene | 2 | NT | 26 | 160 |
| 6 | IOA/MAA/Styrene | 3 | NT | 24 | 291 |

NT = not tested

A good hot melt PSA provides low melt viscosity for coatability and high shear for performance. The data in Table III illustrate that the incorporation of a styryl-functional monomer (namely styrene) into the bead formulation generally provides improved shear strength and lower melt beads of Comparative Example C-4 were prepared without styrene, while the beads of Examples 7 and 8 were prepared with styrene. These examples demonstrate that the incorporation of styrene into formulations comprising MAA provides stable beads.

The beads of Comparative Example C-4 were prepared according to the procedure described above for Comparative Examples C-1, C-2, and C-3 and Examples 1–6, using the charge quantities provided in Table IV. The beads of C-4 were not stable and coagulated during polymerization.

The beads of Example 7 were also prepared according to the procedure described above for Comparative Examples C-1, C-2, and C-3 and Examples 1–6, using the charge quantities provided in Table IV, with the following exception:

The reaction was continued for at least 5 hours with nitrogen purging, during which time it was monitored to prevent the reaction temperature from exceeding 70° C. At this point, 30.9 grams of a 28.3% by weight solution of ammonium hydroxide was added to raise the pH beyond 9.0, and the reaction was continued with heating at 65° C. for two hours.

The beads of Example 8 were prepared according to the procedure described above for Example 7, using the charge quantities provided in Table IV, except that 0.5 grams of acryloxybenzophenone photocrosslinking agent was added with charges C, D, E, and F. The acryloxybenzophenone is labeled in Table IV as Charge J.

The beads of Example 7 and 8 were stable during polymerization.

TABLE IV

| Charge | Description | Amounts Charged*: C-4** | 7 | 8 |
|---|---|---|---|---|
| A. | D.I. Water | 618 | 618 | 618 |
| B. | Cab-O-Sil EH-5 | 0.45 | 0.45 | 0.45 |
| C. | Isooctyl acrylate | 480 | 465 | 465 |
| D. | Methacrylic acid | 20 | 20 | 20 |
| E. | Styrene | 0 | 15 | 15 |
| F. | Isooctylthioglycolate | 0.125 | 0.125 | 0.125 |
| G. | Vazo 64 | 0 | 0 | 0 |
| H. | Vazo 52 | 2.5 | 2.5 | 2.5 |
| I. | ZnO | 0 | 0 | 0 |
| J. | Acryloxybenzophenone | 0 | 0 | 0.5 |

*The quantities listed for charges C, D, and E are provided in parts by weight. The quantities listed for the remaining charges are based on 100 parts of charges C, D, and E (when used).
**Beads not stable during polymerization As indicated previously, the beads of Comparative Example C-4 (comprising MAA but no styrene) coagulated during polymerization, a problem typically overcome by the incorporation of zinc oxide (ZnO) into the bead formulation. In contrast, the beads of Examples 7 and 8 (comprising MAA and styrene with no modifier moiety) were stable during polymerization. Thus, these examples illustrate that styrene may be incorporated into bead formulations comprising MAA to provide stable beads without the need for a ZnO modifier moiety.

The beads of Examples 7 and 8 were collected and washed according to the procedure described above for Comparative Examples C-1, C-2, and C-3 and Examples 1–6. The resulting filtration products contained about 15 to 30% of water and were stable non-agglomerating. The incorporation of styrene imparted stability to the beads during polymerization and storage.

The beads of Examples 7 and 8 were further dried and dissolved in ethyl acetate according to the procedure described above for Comparative Examples C-1, C-2 and C-3 and Examples 1–6 to provide coated films. The coated film of Example 8 was additionally exposed to UV radiation using a PPG High Intensity UV Processor with two lamps operated at full setting to provide a total dosage of 32 millijoules/cm². The coated films were tested for Peel Adhesion and Shear Strength using the test methods described above. Results appear in Table V.

TABLE V

| Example | Composition | Peel Adhesion N/dm | Shear Strength (min) |
|---|---|---|---|
| 7 | IOA/MAA/Styrene | 30 | 21 |
| 8 | IOA/MAA/Styrene | 28 | 780 |

This Example shows that crosslinking may be used to increase shear strength without a significant loss of peel adhesion.

EXAMPLE 9

Acrylate polymer beads were prepared using acrylic acid (AA). The reaction was carried out in two liter split flask equipped with condenser, thermowell, nitrogen inlet, stainless steel motor-driven agitator, and a heating mantle with temperature control. The reaction flask was first charged with 750 g of deionized water followed by the addition of 6 g of tricalcium phosphate, 0.50 g of 1% by weight sodium lauryl sulfate solution, and 67 g of NaCl to form a brine solution. The reactor was heated to 55° C. and maintained at this temperature with agitation for 1 to 2 hours while purging with nitrogen until the tricalcium phosphate was thoroughly coated with the surfactant.

A monomer premix was prepared using 465 g of IOA, and 20 g of AA, and 15 g of styrene. To this 2.5 g of VAZO™ 52 initiator, and 0.16 g of isooctylthioglycolate were added with mixing to form a solution. The resulting solution with initiator and chain transfer agent was then added to the initial aqueous mixture with vigorous agitation (700 rpm) to obtain a suspension. The reaction was continued with nitrogen purging for at least 2 hours, during which time it was monitored to prevent the reaction temperature from exceeding 70° C. At this point, 30.9 g of a 28.30% by weight ammonium hydroxide solution was added. The reaction was continued with heating to 65° C. with a nitrogen purge and agitation for 2 hours. The PSA beads were then collected using a Buchner funnel and several washings of deionized water. The resulting filtration product contained about 15 to 30% by weight of water and was stable for storage, transportation and handling for further processing. These beads were dried then dissolved in ethyl acetate solution and coated from solution to a dried thickness of 25 micrometers on a 37 micrometer polyester film. The coated film was tested for peel adhesion and shear strength. The peel adhesion value was 34 N/100 mm, and the shear strength value was 5 minutes. This Example demonstrates that polymer beads may be prepared from IOA, AA and styrene.

We claim:

1. A styryl-modified acrylate polymer pressure sensitive adhesive bead having a glass-transition temperature of 0° C. or less, the bead comprising:

(a) a major amount by weight of an acrylic acid ester monomer of a non-tertiary alcohol, the alcohol having from 1 to 14 carbon atoms, with the average number of carbon atoms being 4 to 12;

(b) a polar monomer; and (c) a styryl-functional monomer having the structure:

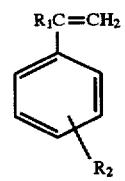

wherein $R_1$ is hydrogen or an alkyl group having 1 to 10 carbon atoms; and $R_2$ is hydrogen, an alkl group having 1 to 10 carbon atoms, a halo group, or a nitro group.

2. A bead according to claim 1 comprising:

(a) about 70 to about 98 parts by weight of the acrylic acid ester monomer of a non-tertiary alcohol;

(b) about 0.05 to about 15 parts by weight of the polar monomer;

(c) about 0.1 to about 10 parts by weight of the styryl-functional monomer;

wherein the sum of (a), (b), and (c) comprises 100 parts by weight;

(d) about 0.01 to about 0.5 part by weight of a chain transfer agent;

(e) about 0.05 to about 1.0 part by weight of a free-radical initiator; and (f) optionally, about 0.01 to about 30 parts by weight of a modifier moiety;

wherein (d), (e), and (f) are each independently based upon 100 parts by weight monomer content.

3. A bead according to claim 2, wherein component (a) is selected from the group consisting of isooctyl acrylate, isononyl acrylate, butyl acrylate, 2-ethylhexyl acrylate and mixtures thereof.

4. A bead according to claim 2, wherein component (b) is selected from the group consisting of acrylic acid, methacrylic acid, acrylamides, substituted acrylamides, and mixtures thereof.

5. A bead according to claim 2, wherein component (c) is styrene.

6. A bead according to claim 2, wherein component (d) is selected from the group consisting of isooctyl thioglycolate and carbon tetrabromide.

7. A bead according to claim 2, wherein component (e) comprises 2,2-azo-bis-(2,4-dimethylpentane nitrile).

8. A bead according to claim 2, wherein optional component (f) is present and is selected from the group consisting of reactive zinc salts, macromers, hydrophobic silica, and mixtures thereof.

9. A bead according to claim 1 comprising:

(a) about 70 to about 98 parts by weight isooctyl acrylate;

(b) about 0.05 to about 15 parts by weight methacrylic acid;

(c) about 0.1 to about 10 parts by weight of the styryl-functional monomer;

wherein (a), (b), and (c) comprise 100 parts by weight of the monomers of the bead;

(d) about 0.01 to about 0.5 parts by weight of a chain transfer agent selected from the group consisting of isooctyl thioglycolate and carbon tetrabromide;

(e) about 0.05 to about 1.0 part by weight of a free radical initiator comprising 2,2-azo-bis-(2,4-dimethylpentane nitrile); and (f) optionally, about 0.01 to about 5 parts by weight of a reactive zinc salt;

wherein (d), (e), and (f) are each independently based on 100 parts by weight monomer content.

10. A bead according to claim 2 comprising from about 1 to about 5 parts by weight styryl-functional monomer.

11. An aqueous suspension of the beads of claim 1 in water.

12. A bead according to claim 2, wherein component (b) comprises methacrylic acid and component (f) is not present.

13. A pressure sensitive adhesive film prepared from the bead of claim 1.

14. A tape comprising the pressure sensitive adhesive film of claim 13 provided on a substrate.

15. A method of aqueous suspension polymerization to provide a styryl-modified acrylate polymer pressure sensitive adhesive bead having a glass transition temperature of 0° C. or less, the method comprising the steps of:

(a) making a monomer-containing premix comprising:
 (i) a major part by weight of an acrylic acid ester monomer of a non-tertiary alcohol, the alcohol having from 1 to 14 carbon atoms, with the average number of carbon atoms being 4 to 12;
 (ii) a polar monomer; and
 (iii) a styryl-functional monomer having the structure:

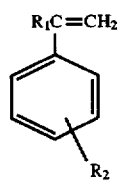

wherein $R_1$ is hydrogen or an alkyl group having 1 to 10 carbon atoms; and $R_2$ is hydrogen, an alkyl group having 1 to 10 carbon atoms, a halo group, or a nitro group;

(b) combining said monomer-containing premix with a water phase containing a suspending agent to form an oil-in-water suspension;

(c) concurrently agitating said suspension and permitting polymerization of said monomers until an aqueous suspension of polymer beads is formed; and (d) collecting said beads;

wherein a total of 0 to about 30 parts by weight of a modifier moiety based on 100 parts by weight total monomer content is added to one or more of the following phases: the water phase; the oil-in-water suspension; and/or the aqueous suspension of polymer beads after the exotherm of polymerization has been reached.

16. A method according to claim 15 further comprising the addition of a base before, during or after polymerization.

17. A method of aqueous suspension polymerization to provide an acrylate polymer pressure sensitive adhesive bead having a glass transition temperature of 0° C. or less, the bead comprising methacrylic acid, wherein a modifier moiety is not required, said method comprising the steps of:

(a) making a monomer-containing premix comprising:
 (i) a major part by weight of an acrylic acid ester monomer of a non-tertiary alcohol, the alcohol having from 1 to 14 carbon atoms, with the average number of carbon atoms being 4 to 12;
 (ii) methacrylic acid;
 (iii) a styryl-functional monomer having the structure:

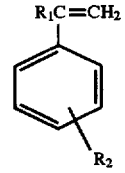

wherein $R_1$ is hydrogen or an alkyl group having 1 to 10 carbon atoms; and $R_2$ is hydrogen, an alkyl group having 1 to 10 carbon atoms, a halo group, or a nitro group;

(b) combining said monomer-containing premix with a water phase containing a suspending agent to form an oil-in-water suspension;

(c) concurrently agitating said suspension and permitting polymerization of said monomers until an aqueous suspension of polymer beads is formed; and (d) collecting said beads.

18. A method according to claim 17 further comprising the addition of a base before, during or after polymerization.

19. The method of claim 15, wherein step (a) comprises:

(a) making a monomer-containing premix comprising:
 (i) about 70 to about 98 parts by weight of the acrylic acid ester monomer of a non-tertiary alcohol;
 (ii) about 0.05 to about 15 parts by weight of the polar monomer; and (iii) about 0.1 to about 10 parts by weight of the styryl-functional monomer;

wherein the sum of (i), (ii), and (iii) comprise 100 parts by weight;

(iv) about 0.01 to about 0.5 part by weight of a chain transfer agent; and (v) about 0.05 to about 1.0 part by weight of a free-radical initiator;

wherein (iv) and (v) are each independently based upon 100 parts by weight monomer content.

20. A method according to claim 19 further comprising the addition of a base before, during or after polymerization.

21. The method of claim 17, wherein step (a) comprises:

(a) making a monomer-containing premix comprising:
   (i) about 70 to about 98 parts by weight of the acrylic acid ester monomer of a non-tertiary alcohol;
   (ii) about 0.05 to about 15 parts by weight of methacrylic acid;
   (iii) about 0.1 to about 10 parts by weight of the styryl-functional monomer;
wherein the sum of (i), (ii), and (iii) comprise 100 parts by weight;
   (iv) about 0.01 to about 0.5 parts by weight of a chain transfer agent; and
   (v) about 0.05 to about 1.0 parts by weight of a free-radical initiator;
wherein (iv) and (v) are each independently based upon 100 parts by weight monomer content.

22. A method according to claim 21 further comprising the addition of a base before, during or after polymerization.

23. A styryl-modified acrylate polymer pressure sensitive adhesive bead wherein at least one monomer used to polymerize the pressure sensitive adhesive bead is styrene, comprising:

(a) about 70 to about 98 parts by weight of an acrylic acid ester monomer of a non-tertiary alcohol, the alcohol having from 1 to 14 carbon atoms, with the average number of carbon atoms being 4 to 12;

(b) about 0.05 to about 15 parts by weight of a polar monomer;

(c) about 0.1 to about 10 parts by weight of styrene;

wherein the sum of (a), (b), and (c) comprises 100 parts by weight;

(d) about 0.01 to about 0.5 part by weight of a chain transfer agent;

(e) about 0.05 to about 1.0 part by weight of a free-radical initiator; and (f) optionally, about 0.01 to about 30 parts by weight of a modifier moiety;

wherein (d), (e), and (f) are each independently based upon 100 parts by weight monomer content.

24. A bead according to claim 1, wherein $R^1$ is an alkyl group having 1 to 2 carbon atoms.

25. A bead according to claim 1, wherein $R^2$ is an alkyl group having 1 to 3 carbon atoms.

26. A bead according to claim 1, wherein $R^1$ is an alkyl group having 1 to 2 carbon atoms and $R^2$ is an alkyl group having 1 to 3 carbon atoms.

* * * * *

UNITED STATES PATENT AND TRADEMARK OFFICE
CERTIFICATE OF CORRECTION

PATENT NO.: 5,728,786
DATED: March 17, 1998
INVENTOR(S): Chung I. Young, Albert I. Everaerts, and Stephen E. Krampe It is certified that error appears in the above-identified patent and that said Letters Patent is hereby corrected as shown below:

Column 12, line 49, "alkl" should read --alkyl--.

Signed and Sealed this

Eighteenth Day of May, 1999

Attest:

Q. TODD DICKINSON

Attesting Officer

Acting Commissioner of Patents and Trademarks